United States Patent
Wolf et al.

[11] 3,883,524
[45] May 13, 1975

[54] QUINAZOLINE DERIVATIVES

[75] Inventors: Erhard H. Wolf, Hofheim, Taunus, Germany; Brian J. Duffy, Flanders, N.J.

[73] Assignee: American Hoechst Corporation, Bridgewater, N.J.

[22] Filed: June 8, 1972

[21] Appl. No.: 260,799

[52] U.S. Cl.............. 260/247.2 A; 260/239 BF; 260/239.3 P; 260/256.4 Q; 424/248; 424/251
[51] Int. Cl............................................. C07d 87/42
[58] Field of Search........... 260/247.2 A, 256.4 Q, 260/239.3 P

[56] References Cited
UNITED STATES PATENTS

| | | | |
|---|---|---|---|
| 3,073,826 | 1/1963 | Scarborough | 260/256.4 Q |
| 3,081,306 | 3/1963 | Lombardino | 260/256.4 Q |
| 3,655,664 | 4/1972 | Pater | 260/256.4 Q |

Primary Examiner—Lorraine A. Weinberger
Assistant Examiner—Paul J. Killos
Attorney, Agent, or Firm—Curtis, Morris & Safford

[57] ABSTRACT

Tricyclic N-cycloaminoquinazolinediones of the formula:

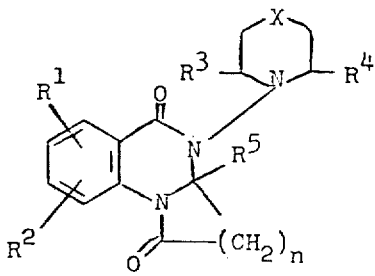

in which $R^1$ and $R^2$ are hydrogen, halogen, nitro or amino, $R^3$ and $R^4$ are hydrogen or lower alkyl, $R^5$ is lower alkyl, X is oxygen or $(CH_2)_m$, $m$ being zero, 1 or 2 and $n$ is 2, 3 or 4 are prepared by reacting anthranilhydrazides with keto carboxylic acids or derivatives thereof. The compounds obtained have antiinflammatory, analgesic, and antipyretic activity.

11 Claims, No Drawings

QUINAZOLINE DERIVATIVES

This invention relates to substituted quinazolines and to a method of treatment for reducing inflammation, pain, or fever.

It is known that alkyl- and aryl- substituted 3-amino-2,3-dihydro-4(1H)-quinazolinones can be prepared by reaction of substituted anthranilhydrazides with aldehydes or ketones. These compounds possess pharmacodynamic activity and are useful as adjuvants in the treatment of insomnia, convulsions, and mental disturbances. For example, 1,5-dioxo-4-dimethylamino-3a-methyl-1,2,3,3a-tetrahydropyrrolo[1,2-a]quinazoline of the formula:

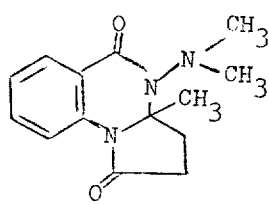

is disclosed in U.S. Pat. No. 3,375,250.

In accordance with the present invention, substituted quinazolines are prepared by reacting certain anthranilhydrazides with aliphatic carboxylic acids, esters, or acid halides having keto groups. A substituted quinazoline is formed in a two-step reaction, the first step being the formation of the bicyclic quinazoline ring system, and the second being a further cyclization to the desired tricyclic quinazoline derivative. Isolation of the intermediate is possible but unnecessary.

The compounds of the present invention are useful as antiinflammatory, analgesic, and antipyretic agents.

The preparation of the tricyclic N-cycloamino-substituted quinazoline derivatives of the invention is believed to take place as shown in the following equation:

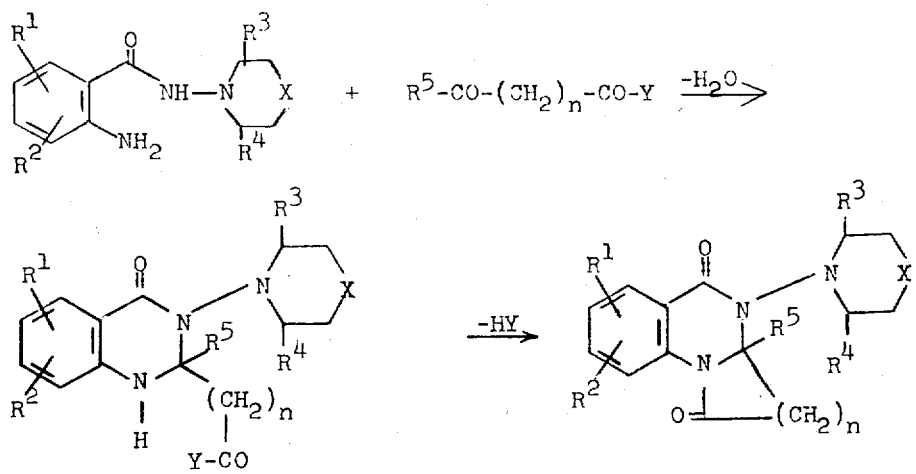

wherein $R^1$ and $R^2$ are the same or different and represent hydrogen, halogen or nitro; $R^3$ and $R^4$ are the same or different, and represent hydrogen or branched or unbranched alkyl of 1 to 4 carbon atoms; $R^5$ represents an alkyl of 1 to 4, preferably 1 or 2 carbon atoms, $n$ equals 2, 3, or 4; X represents oxygen or $(CH_2)_m$, $m$ being zero, 1, or 2; and Y represents hydroxy, halogen, preferably chlorine, or alkoxy of 1 to 4 carbon atoms. It is understood that if $m$ is zero, X stands for a direct bond and in cases where $m$ is 1 or 2, X stands for methylene or ethylene, respectively.

Tricyclic N-cycloamino-substituted quinazoline derivatives wherein $R^1$ and $R^2$ are the same or different and represent hydrogen or halogen and at least one amino group and $R^3$, $R^4$, $R^5$, X, and $n$ have the same meaning as defined above are prepared by catalytic hydrogenation of the corresponding nitro-substituted tricyclic N-cycloamino-substituted quinazoline derivatives of the invention.

The preferred compounds of the invention are tricyclic quinazoline derivatives of the formula:

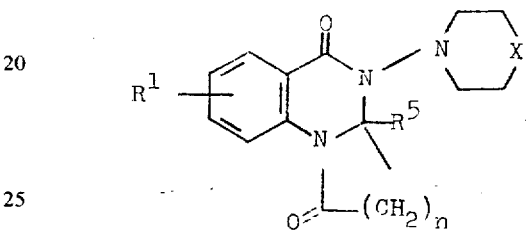

wherein $R^1$ represents hydrogen, halogen or amino; $R^5$ represents methyl or ethyl; $n$ equals 2 or 3; and X represents oxygen or $(CH_2)_m$, $m$ being zero or 1, i.e. X is oxygen, a direct bond or methylene. The aforementioned preferred compounds are prepared by reacting an anthranilhydrazide of the formula:

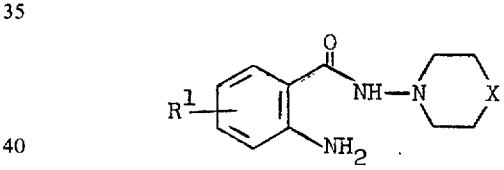

wherein $R^1$ and X have the same meaning as defined above, with a keto carboxylic acid, ester, or acid halide of the formula:

$$R^5 - CO - (CH_2)_n - CO - Y$$

wherein R⁵ and $n$ have the same meaning as defined above, and Y represents hydroxy, halogen, methoxy, ethoxy or propoxy.

Illustrative examples of the tricyclic quinazoline derivatives in accordance with the invention are:
a. 8-chloro-1,5-dioxo-1,2,3,3a,4,5-hexahydro-4-homopiperidino-3a-methyl-pyrrolo[1,2-a]quinazoline
b. 1,5-dioxo-1,2,3,3a,4,5-hexahydro-3a-methyl-4-morpholino-pyrrolo[1,2-a]quinazoline
c. 1,6-dioxo-1,2,3,4,4a,5-hexahydro-4a-methyl-5-morpholino-pyrido[1,2-a]quinazoline
d. 1,5-dioxo-1,2,3,3a,4,5-hexahydro-3a-methyl-4-piperidino-pyrrolo[1,2-a]quinazoline The process of the invention is carried out between room temperature and 250°C, preferably in the range of from 40° to 200°C, either in the absence or presence of an inert organic solvent or a mixture of inert organic solvents. The reaction is best carried out by azeotropic distillation using a solvent which is able to remove the water formed in the reaction. Suitable solvents are aromatic hydrocarbons, for example benzene, toluene, and xylene, as well as aliphatic and aromatic halogenated hydrocarbons, for example, tetrachloroethane and ortho-dichlorobenzene as well as nitrated aromatic hydrocarbons, for example nitrobenzene. The time necessary to complete the reaction is dependent upon the temperature, the structure of the reaction components, and the presence or absence of a catalyst. The time varies from a few minutes to 24 hours, but in most cases the reaction is completed after about 4 hours.

The use of a catalyst is desirable in order to complete the reaction within a reasonable time. An acidic catalyst such as an organic acid, for example para-toluenesulfonic acid, or an inorganic acid, for example hydrochloric acid is preferred. The concentration of catalyst is most desirably within the range of from 0.1 to 2.0% by weight, calculated on the weight of anthranilhydrazide used. In general, the reaction is carried out at atmospheric pressure.

The anthranilhydrazide employed as starting material is prepared by known methods, for example by reaction of an anthranilic acid ester or an isatoic anhydride with an appropriate hydrazine. Suitable anthranilhydrazides are for example:

2-amino-4-chloro-N-homopiperidinobenzamide
2-amino-N-morpholinobenzamide
2-amino-N-piperidinobenzamide
2-amino-3,5-dichloro-N-morpholinobenzamide The compounds prepared in accordance with this invention are useful as antiinflammatory agents due to their ability to suppress inflammation in mammals. The activity of the compounds is shown in the antiinflammatory assay of carrageenin-induced rat paw edema (cf. Proc. Soc. Exp. Biol. Med., 111 (1962), 544; J. Pharmacol. Exp. Ther., 141 (1963), 369), in which for example, 1,5-dioxo-1,2,3,3a,4,5-hexahydro-3a-methyl-4-morpholino-pyrrolo[1,2-a]quinazoline effects a 37% inhibition of edema at a dose of 200 mg/kg. 1,5-Dioxo-1,2,3,3a,4,5-hexahydro-3a-methyl-4-morpholino-pyrrolo[1,2-a]quinazoline also exhibits at a dose of 50 mg/kg a 50% inhibition of 2-phenyl-1,4-benzoquinone-induced writhing in rats, a standard assay for analgesia (cl. Proc. Soc. Exp. Biol. Med., 95 (1957), 729) and lowers the body temperature of fevered rats (a standard pharmacological test procedure) at a dose of 100 mg/kg. For comparison, aspirin, a known antiinflammatory, analgesic, and antipyretic agent effects a 53% inhibition of edema at a dose of 128 mg/kg, a 34% inhibition of 2-phenyl-1,4-benzoquinone-induced writhing at a dose of 60 mg/kg, and antipyretic effects at a dose of 150 mg/kg.

The tricyclic N-cycloamino-substituted quinazoline derivatives (or their pharmaceutically acceptable salts, such as hydrochlorides, maleates, sulfates and citrates) of the present invention have thus been found to be useful for suppressing inflammation in mammals when administered in amounts ranging from 1 mg to about 200 mg per kg of body weight per day. The compounds of the present invention may be administered by any convenient route such as orally, intramuscularly, intravenously, subcutaneously, or inter-peritoneally. The preferred route of administration is oral.

The active compounds of the present invention may be orally administered, for example, with an inert diluent or with an edible carrier, or they may be enclosed in gelatin capsules, or they may be compressed into tablets. For the purpose of oral therapeutic administration, the active compounds of this invention may be incorporated with excipients and used in the form of tablets, troches, capsules, elixirs, suspensions, syrups, wafers, chewing gum, and the like. These preparations should contain at least 0.5% of active compound, but may be varied depending upon the particular form and may conveniently be between 7% to about 70% of the weight of the unit. The amount of active compound in such compositions is such that a suitable dosage will be obtained. Preferred compositions and preparations according to the present invention are prepared so that an oral dosage unit form contains between 10 and 200 milligrams of active compound.

The tablets, pills, capsules, troches, and the like may also contain the following ingredients: a binder such as gum tragacanth or gelatin; an excipient such as starch or lactose, a disintegrating agent such as alginic acid, potato starch and the like; a lubricant such as magnesium stearate; and a sweetening agent such as sucrose or saccharin may be added or a flavoring agent such as peppermint, methyl salicylate, or orange flavoring. When the dosage unit form is a capsule, it may contain, in addition to materials of the above type, a liquid carrier such as a fatty oil. Other dosage unit forms may contain other various materials which modify the physical form of the dosage unit, for example, as coatings. Thus, tablets or pills may be coated with sugar, shellac, or both. A syrup may contain, in addition to the active compounds, sucrose as a sweetening agent, and certain preservatives, dyes and colorings, and flavors. Materials used in preparing these various compositions must be pharmaceutically pure and non-toxic in the amounts utilized.

The invention is further illustrated by the following examples. The temperatures are given in ° Centigrade.

EXAMPLE I 1,5-Dioxo-1,2,3,3a,4,5-hexahydro-3a-methyl-4-morpholino-pyrrolo[1,2-a]quinazoline.

8.0 g (0.036 mole) of 2-amino-N-morpholinobenzamide and 6.5 g (0.045 mole) of ethyl levulinate are heated to reflux (with agitation) in 125 ml. toluene with 0.15 g para-toluenesulfonic acid added as catalyst.

Separation of water is very rapid and refluxing is continued until thin-layer chromatography (hereafter TLC) indicates complete conversion of the quinazoline ester intermediate to the tricyclic product (total reaction time about 6 hours). The reaction mixture is cooled and filtered to remove decomposed material and the filtrate concentrated to dryness on a rotary evaporator. The crude material is recrystallized twice from ethanol to give 6.2 g (57.0% of theory) of slightly tan crystals, m.p. 162.5°–164.0°. The product corresponds to the formula:

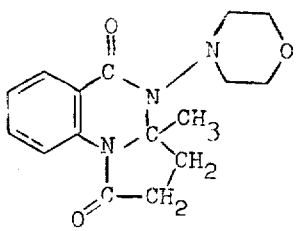

EXAMPLE II 1,6-Dioxo-1,2,3,4,4a,5-hexahydro-4a-methyl-5-morpholino-pyrido[1,2-a]quinazoline.

8.0 g (0.036 mole) of 2-amino-N-morpholinobenzamide and 6.4 g (0.050 mole) of 5-oxohexanoic acid are heated to reflux (with agitation) in a mixture of 100 ml. o-dichlorobenzene and 40 ml. xylene (xylene in water trap) with 0.15 g para-toluenesulfonic acid added as catalyst. Completion of reaction is determined by TLC and water separation. Total reflux time is about 4 hours. The reaction mixture is cooled, filtered, and evaporated to dryness on a rotary evaporator. The crude solid so obtained is filtered to remove residual solvent and then recrystallized twice from ethanol to give 6.4g (56.5% of theory) of lustrous, white crystals mp 198.0°–199.5° of the formula:

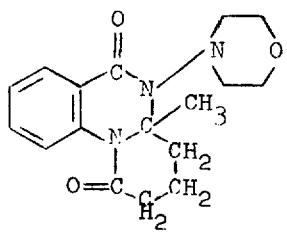

EXAMPLE III

7-Chloro-1,5-dioxo-1,2,3,3a,4,5-hexahydro-3a-methyl-4-morpholino-pyrrolo[1,2-a]quinazoline.

9.0 g (0.035 mole) of 2-amino-5-chloro-N-morpholinobenzamide and 6.5 g (0.045 mole) of ethyl levulinate are heated to reflux (with agitation) in 150 ml toluene together with 0.15 g of para-toluenesulfonic acid added as catalyst. Completion of the reaction is determined by TLC. The reaction time is about 6 hours. The mixture is cooled and the solvent removed on a rotary evaporator. The crude solid so obtained is recrystallized twice from acetonitrile to give 8.4 g (71.0% of theory) of lustrous, white crystals, m.p., 231.0°–233.0°, corresponding to the formula:

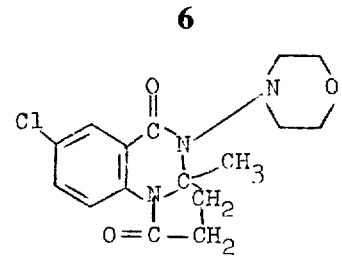

EXAMPLE IV

8-Chloro-1,6-dioxo-1,2,3,4,4a,5-hexahydro-4a-methyl-5-morpholino-pyrido[1,2-a]quinazoline.

9.0 g (0.035 mole) of 2-amino-5-chloro-N-morpholinobenzamide and 5.9 g (0.045 mole) of 5-oxohexanoic acid are heated to reflux in 150 ml toluene (with agitation) together with 0.15 g of para-toluenesulfonic acid as catalyst. Considerable foaming occurs at reflux. The separation of water ceases at 1 mole-equivalent and the product begins crystallizing from the refluxing solvent. The reaction mixture is cooled and the crude product removed by filtration. Solid 4-(6'-chloro-3'-morpholino-2'-methyl-4'(1'H)-oxoquinazolin-2'-yl)butyric acid is recrystallized once from a large volume of acetonitrile to give 7.2 g (56.0% of theory) of off-white crystals, m.p., 204.0°–205.0°, corresponding to the formula:

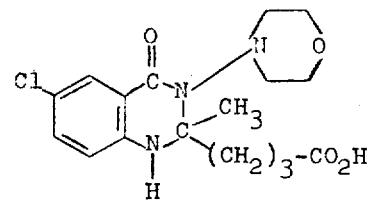

1.20 g (0.0033 mole) of the aforementioned 4-(6'-chloro-3'-morpholino-2'-methyl-4'(1'H)-oxoquinazolin-2'-yl)butyric acid is heated to reflux (with agitation) in a mixture of 70 ml. o-dichlorobenzene and 30 ml. xylene (xylene in water trap) with 0.02 g of para-toluenesulfonic acid added as catalyst. Completion of reaction is determined by TLC. The reaction mixture is cooled and filtered, and the solvent removed on a rotary evaporator. The crude solid so obtained is filtered to remove residual solvent and then recrystallized once from ethanol to give 0.60 g (52.0% of theory) of off-white crystals, m.p. 207.0°–209.0°, corresponding to the formula:

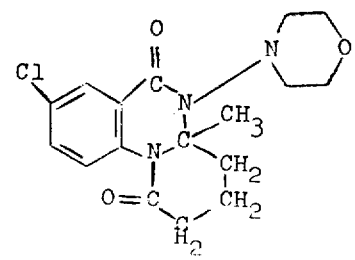

EXAMPLE V

7-Bromo-1,5-dioxo-1,2,3,3a,4,5-hexahydro-3a-methyl-4-morpholino-pyrrolo[1,2-a]quinazoline/monohydrate.

15.0 g (0.050 mole) of 2-amino-5-bromo-N-morpholinobenzamide and 8.0 g (0.055 mole) of ethyl levulinate are heated to reflux in 200 ml. xylene (with agitation) with 0.30 g para-toluenesulfonic acid added as catalyst. Completion of the reaction requires 7 hours at reflux (as determined by TLC). The crude product crystallizes upon cooling and is removed by filtration and recrystallized once from n-butylacetate to give 11.5 g (58.0% of theory) of slightly tan, lustrous crystals, mp 192.0°–195.0°C., as the monohydrate corresponding to the formula:

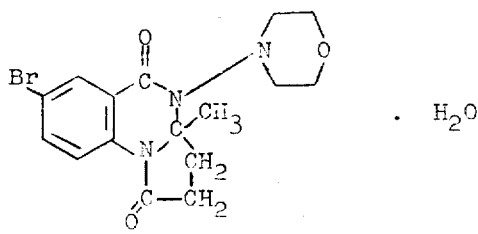

EXAMPLE VI 7,9-Dichloro-1,5-dioxo-1,2,3,3a,4,5-hexahydro-3a-methyl-4-morpholino-pyrrolo[1,2-a]quinazoline.

7.3 g (0.025 mole) of 2-amino-3,5-dichloro-N-morpholinobenzamide and 4.1 g (0.035 mole) of levulinic acid are heated to reflux (with agitation) in 175 ml. xylene with 0.15 g para-toluenesulfonic acid added as catalyst. Completion of the reaction is determined by water separation. Total reflux time is 5 hours. Upon cooling, the crude product crystallizes and is removed by filtration. The crude material is recrystallized twice from xylene (large volume) to give 4.0 g (43.0% of theory) of off-white crystals, mp 279.0°–281.5°, corresponding to the formula:

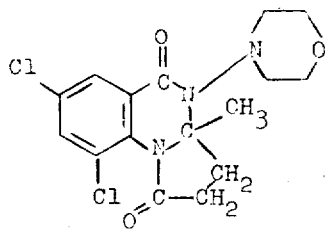

EXAMPLE VII 1,5-Dioxo-1,2,3,3a,4,5-hexahydro-3a-methyl-4-pyrrolidinyl-pyrrolo[1,2-a]quinazoline.

5.0 g (0.025 mole) of 2-amino-N-pyrrolidinyl-benzamide and 5.5 g (0.047 mole) levulinic acid are heated to reflux (with agitation) in 150 ml. xylene with 0.10 g para-toluenesulfonic acid added as catalyst. Completion of reaction is determined by TLC and water separation. The reaction mixture is cooled, filtered, and concentrated to dryness on a rotary evaporator. The crude solid so obtained is recrystallized twice from acetonitrile to give 3.7 g (52.0% of theory) of lustrous, white crystals m.p. 119.0°–120.5°, corresponding to the formula:

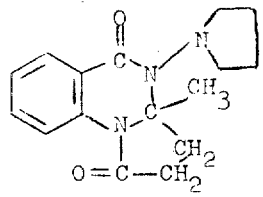

EXAMPLE VIII 1,5-Dioxo-1,2,3,3a,4,5-hexahydro-3a-methyl-4-piperidino-pyrrolo[1,2-a]quinazoline.

10.5 g (0.048 mole) of 2-amino-N-piperidino-benzamide and 9.0 g (0.062 mole) of ethyl levulinate are heated to reflux in 175 ml. toluene (with agitation) with 0.20 g para-toluenesulfonic acid added as catalyst. The course of the reaction is followed by TLC in the usual manner. Following completion of the reaction, the reaction mixture is cooled, filtered, and concentrated to dryness on a rotary evaporator. The crude product is recrystallized twice from acetonitrile to give 9.6 g (67.0% of theory) of a white solid m.p. 159.5°–160.5°, corresponding to the formula:

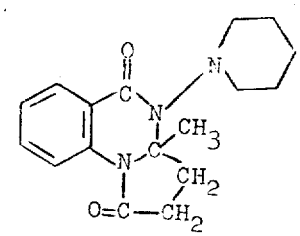

EXAMPLE IX 1,6-Dioxo-1,2,3,4,4a,5-hexahydro-4a-methyl-5-piperidino-pyrido[1,2-a]quinazoline.

11.0 g (0.050 mole) of 2-amino-N-piperidino-benzamide and 8.0 g (0.060 mole) of 5-oxohexanoic acid are heated to reflux in 175 ml xylene with 0.20 g para-toluenesulfonic acid added as catalyst. Completion of reaction is determined by TLC and water separation. Total reflux time is approximately 6 hours. After cooling, the reaction mixture is filtered and the solvent removed on a rotary evaporator. The crude solid so obtained is recrystallized twice from acetonitrile to give 8.8 g (56.0% of theory) of lustrous, white plates, m.p., 158.0°–160.0°, corresponding to the formula:

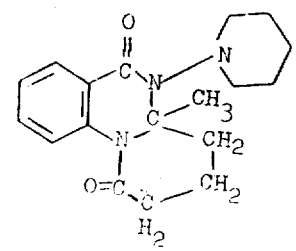

EXAMPLE X 1,5-Dioxo-1,2,3,3a,4,5-hexahydro-3a-methyl-4-(2'-methyl-piperidino)pyrrolo[1,2-a]quinazoline.

5.0 g (0.021 mole) of 2-amino-N-(2'-methyl-piperidino)benzamide and 3.0 g (0.026 mole) of levulinic acid are heated to reflux in 175 ml. xylene with 0.1 g of para-toluenesulfonic acid as catalyst. After 3 hours at reflux approximately 0.75 ml. of water separates and TLC indicates a single product and a very minor amount of starting material. The reaction mixture is then cooled, filtered, and the solvent removed on a rotary evaporator. The dark, crude semi-solid so obtained is extracted with hot n-heptane. The product crystallizes from the n-heptane on cooling and is removed by filtration. The solid is recrystallized twice from diisopropylether to give 3.9 g (59.0% of theory) of white crystals mp 109.0°–110.5°, corresponding to the formula:

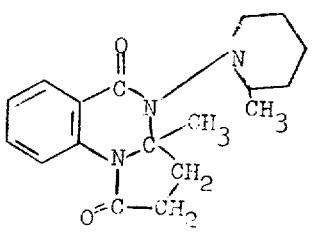

EXAMPLE XI

8-Chloro-1,5-dioxo-1,2,3,3a,4,5-hexahydro-4-homopiperidino-3a-methyl-pyrrolo[1,2-a]quinazoline.

30.0 g (0.152 mole) of 4-chloroisatoic anhydride is dissolved in 75 ml. N,N-dimethylformamide at 45°. With agitation, 21.0 g (0.184 mole) of N-aminohomopiperidine is added to this mixture in 15 minutes. It is observed that $CO_2$ evolution is slow at the beginning of the feed, but becomes more rapid as the reaction progresses. $CO_2$ evolution is complete shortly after the end of the feed. TLC indicates primarily one product and no starting anhydride. The reaction mixture is cooled and the solvent removed on a rotary evaporator. The crude solid 2-amino-4-chloro-N-homopiperidinobenzamide so obtained is recrystallized once from acetonitrile to give 22.5 g (55.5% of theory) of white needles m.p. 146.0°–147.0°, corresponding to the formula:

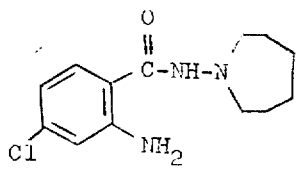

8.0 g (0.030 mole) of the aforementioned 2-amino-4-chloro-N-homopiperidinobenzamide and 5.0 g (0.035 mole) of ethyl levulinate are heated to reflux in 175 ml. toluene (with agitation) with 0.10 g para-toluenesulfonic acid added as catalyst. Separation of water is complete after 2½ hours of refluxing, at which point TLC indicates a small amount of starting anthranilhydrazide and an approximately equal distribution of quinazoline ester intermediate and tricyclic product. 0.05 g additional catalyst is added and refluxing continued for 4½ hours. TLC indicates only the tricyclic product and no starting anthranilhydrazide at this point.

The reaction mixture is cooled and filtered to remove insoluble by-products. The toluene filtrate is concentrated on a rotary evaporator and the crude solid so obtained is removed by filtration. The crude solid is recrystallized twice from acetonitrile to give 6.1 g (58.5% of theory) of white crystals, m.p. 152.0°–153.5°C, corresponding to the formula:

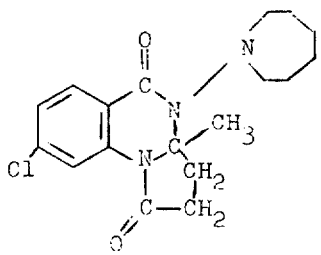

EXAMPLE XII 1,5-Dioxo-1,2,3,3a,4,5-hexahydro-3a-methyl-4-morpholino-7-nitro-pyrrolo[1,2-a]quinazoline.

5.2 g (0.020 mole) of 2-amino-5-nitro-N-morpholinobenzamide, and 4.0 g (0.035 mole) of levulinic acid are heated to reflux in 150 ml. nitrobenzene — 50 ml. xylene mixture (xylene in water trap) with 0.10 g para-toluenesulfonic acid added as catalyst. Separation of the theoretical amount of water occurs in two hours and the mixture is held at reflux for an additional one-half hour. The reaction mixture is cooled and the solvent mixture removed on a rotary evaporator. The nitrobenzene can not be completely removed but the product crystallizes from the remaining solvent. After cooling, the product is removed by filtration and recrystallized twice from acetonitrile to give 3.1 g (45.0% of theory) of off-white (faintly yellow) crystals, m.p. 206.0°–208.0°, corresponding to the formula:

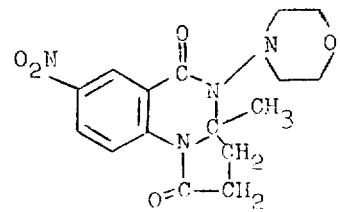

EXAMPLE XIII

7-Amino-1,5-dioxo-1,2,3,3a,4,5-hexahydro-3a-*methyl*-4-morpholinopyrrolo[1,2-a]quinazoline.

2.00 g (0.0058 mole) of the aforementioned 1,5-dioxo-1,2,3,3a,4,5-hexahydro-3a-methyl-4-morpholino-7-nitropyrrolo[1,2-a]quinazoline and 0.15 g of 5.00% palladium on carbon (dry basis) in 125 ml. absolute ethanol are agitated in a Parr Pressure Reaction Apparatus with hydrogen at a pressure of 50 psig at room temperature. After the initial uptake (as indicated by pressure drop) of hydrogen has ceased after about 4 hours, the reaction mixture is heated to 70° for 6 hours to a maximum pressure of 60 psig. The reaction mixture is cooled, the hydrogen vented and then heated to 75° with 150 ml. additional ethanol to dissolve the product. After cooling, the catalyst is removed by filtration and the solvent removed on a rotary evaporator to give a crude solid. The crude compound is recrystallized twice from acetonitrile to give 1.25 g (68.5% of theory) of white, short, fine needles, m.p. 264.5°–267.0°, corresponding to the formula:

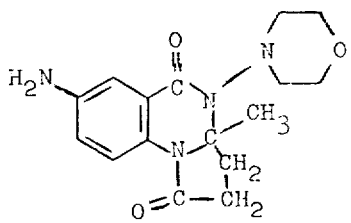

EXAMPLE XIV
Preparation of Tablet Formulation

| Ingredient | Milligrams per tablet |
| --- | --- |
| 1,5-Dioxo-1,2,3,3a,4,5-hexahydro-3a-methyl-4-morpholinopyrrolo[1,2-a]-quinazoline | 100 |
| Lactose | 200 |
| Cornstarch (for mix) | 50 |
| Cornstarch (for paste) | 50 |
| Magnesium stearate | 10 |

The active ingredient, lactose, and cornstarch (for mix) are thoroughly blended together. The cornstarch (for paste) is suspended in water at a ratio of 10 grams of cornstarch per 80 milliliters of water and heated with stirring to form a paste. The paste is then used to granulate the blended powders. The wet granules are screened through a No. 8 sieve and dried at 35°. The dried granules are screened through a No. 16 sieve. The mixture is lubricated with magnesium stearate and compressed into tablets on a suitable tableting machine such that each tablet contains 100 milligrams of active ingredient.

EXAMPLE XV
Preparation of Capsule Formulation

| Ingredient | Milligrams per capsule |
| --- | --- |
| 7-Amino-1,5-dioxo-1,2,3,3a,4,5-hexahydro-3a-methyl-4-morpholino-pyrrolo[1,2-a]quinazoline | 100 |
| Starch | 95 |
| Magnesium stearate | 5 |

The active ingredient, starch, and magnesium stearate are thoroughly blended together. The resulting mixture is used to fill hard shell capsules of a suitable size at a fill weight of 200 milligrams per capsule.

We claim:
1. A compound of the formula

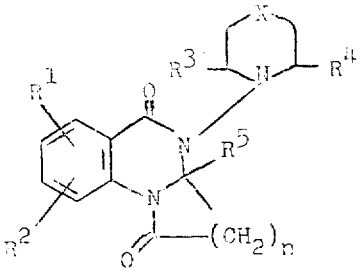

in which $R^1$ and $R^2$ are hydrogen, halogen, nitro or amino, $R^3$ and $R^4$ are hydrogen or lower alkyl, $R^5$ is lower alkyl, X is oxygen or $(CH_2)_m$, $m$ being zero, 1 or 2 and $n$ is 2, 3 or 4, and the pharmaceutically acceptable salts thereof.

2. A compound as defined in claim 1, wherein $R^1$ and $R^2$ are hydrogen, chlorine, bromine, nitro or amino, $R^3$ and $R^4$ are hydrogen or alkyl of 1 to 4 carbon atoms, $R^5$ is alkyl of 1 to 4 carbon atoms, X is oxygen or $(CH_2)_m$, $m$ being zero, 1 or 2 and $n$ is 2 or 3.

3. A compound as defined in claim 1, wherein $R^1$ and $R^2$ are hydrogen, chlorine, bromine, nitro or amino, $R^3$ and $R^4$ are hydrogen or methyl, $R^5$ is methyl or ethyl, X is oxygen or $(CH_2)_m$, $m$ being zero, 1 or 2 and $n$ is 2 or 3.

4. A compound as defined in claim 1, wherein $R^1$ is hydrogen, chlorine, bromine, nitro or amino, $R^2$ is hydrogen or chlorine, $R^3$ is hydrogen or methyl, $R^4$ is hydrogen, $R^5$ is methyl, X is oxygen or $(CH_2)_m$, $m$ being zero, 1 or 2 and $n$ is 2 or 3.

5. A compound as defined in claim 1, wherein $R^1$ and $R^2$ are hydrogen, chlorine or bromine, $R^3$ and $R^4$ are hydrogen, $R^5$ is methyl, X is oxygen or $(CH_2)_m$, $m$ being zero or 1 and $n$ is 2 or 3.

6. The compound as defined in claim 1, wherein $R^1$, $R^2$, $R^3$ and $R^4$ are hydrogen, $R^5$ is methyl, X is oxygen and $n$ is 2.

7. The compound as defined in claim 1, wherein $R^1$, $R^2$, $R^3$ and $R^4$ are hydrogen, $R^5$ is methyl, X is oxygen and $n$ is 3.

8. The compound as defined in claim 1, wherein $R^1$, $R^2$, $R^3$ and $R^4$ are hydrogen, X is a direct bond and $n$ is 2.

9. The compound as defined in claim 1, wherein $R^1$, $R^2$, $R^3$ and $R^4$ are hydrogen, X is methylene and $n$ is 2.

10. The compound as defined in claim 1, wherein $R^1$, $R^2$, $R^3$ and $R^4$ are hydrogen, X is methylene and $n$ is 3.

11. The compound as defined in claim 1, wherein $R^1$ is amino, $R^2$, $R^3$ and $R^4$ are hydrogen, $R^5$ is methyl, X is oxygen and $n$ is 2.

* * * * *